(12) United States Patent
O'Shea et al.

(10) Patent No.: US 8,244,584 B1
(45) Date of Patent: Aug. 14, 2012

(54) SYSTEM FOR MANAGING ONLINE ADVERTISING INCLUDING TICKER FOR DATA DISPLAY

(75) Inventors: Kelly O'Shea, Los Angeles, CA (US); Irena Besic, Beverly Hills, CA (US)

(73) Assignee: Kelly O'Shea, Sunny Isles, FL (US)

( * ) Notice: Subject to any disclaimer, the term of this patent is extended or adjusted under 35 U.S.C. 154(b) by 477 days.

(21) Appl. No.: 11/690,757

(22) Filed: Mar. 23, 2007

Related U.S. Application Data

(60) Provisional application No. 60/785,081, filed on Mar. 23, 2006.

(51) Int. Cl.
*G06F 17/30* (2006.01)
*G06F 15/16* (2006.01)

(52) U.S. Cl. ............... 705/14.41; 707/706; 707/713; 707/736; 707/758; 707/781; 709/217; 709/227

(58) Field of Classification Search .......... 705/14, 705/26, 14.41; 707/3, 6, 706, 713, 736, 758, 707/781; 709/223, 217, 227; 715/824
See application file for complete search history.

(56) References Cited

U.S. PATENT DOCUMENTS 6,269,361 B1 * 7/2001 Davis et al. ........................ 1/1
6,278,449 B1 * 8/2001 Sugiarto et al. ............... 715/826
2003/0033292 A1 * 2/2003 Meisel et al. ..................... 707/3
2003/0149622 A1 * 8/2003 Singh et al. ..................... 705/14
2004/0133469 A1 * 7/2004 Chang ............................. 705/14
2005/0097190 A1 * 5/2005 Abdelhak ..................... 709/217
2005/0097204 A1 * 5/2005 Horowitz et al. ............ 709/223
2006/0212447 A1 * 9/2006 Davis et al. ....................... 707/6
2006/0247981 A1 * 11/2006 Singh et al. ..................... 705/26
2007/0150353 A1 * 6/2007 Krassner et al. ............... 705/14

OTHER PUBLICATIONS

Yammer Ticker integrated with SAP updates, Feb. 24, 2012, ComputerworldUK.com, pp. 1-4.*

* cited by examiner

*Primary Examiner* — John Weiss
*Assistant Examiner* — Marilyn G Macasiano
(74) *Attorney, Agent, or Firm* — Venable LLP; Stefan J. Kirchanski

(57) ABSTRACT

A system provides a unified way for a user to manage a number of separate online advertising accounts. A simple and secure web page accessible through an ordinary web browser is used to both control and receive data from the separate accounts. The user can alter aspects of the various accounts (bid amount per click, etc.) and these changes will be relayed to the individual accounts. The system also includes a "ticker" application that operates constantly on the user's personal computer and displays selected online data in a separate window that can quickly be brought to the front and checked as needed. The system also provides visual or audible alarms when the data from the online accounts indicate that certain preset threshold have been passed. The system also provides the user with a variety of custom reports enabling the user to better control and exploit online advertising.

11 Claims, 9 Drawing Sheets

SYSTEM FOR MANAGING ONLINE ADVERTISING INCLUDING TICKER FOR DATA DISPLAY

CROSS-REFERENCE TO PRIOR APPLICATIONS

The present application is based on an claims the benefit of U.S. Provisional Patent Application No. 60/785,081 filed on 23 Mar. 2006, which application is incorporated herein by reference.

U.S. GOVERNMENT SUPPORT

NA

BACKGROUND OF THE INVENTION

1. Area of the Art

The present invention deals with online advertising systems and more specifically with a software tool and system to enable online advertisers to make the most efficient and effective use of their advertising expenditures.

2. Description of the Background Art

The public is well aware of the incredible success of online search companies such as Yahoo and Google—in particular there is awareness of Google which has recently enjoyed incredible success in the stock market. This success is due not to mere speculation but to the significant revenues enjoyed by this company. Many Internet users give little thought to how Google and similar companies earn money. While almost every one knows that it all due to "advertising," it is difficult to imagine that on line search engines can reap significant revenues from banner ads and the like. In fact, what these companies sell are "clicks." When an online search displays a lead to a commercial cite, the search company is compensated each time a user "clicks" on the lead and visits the linked to commercial site.

Each different search engine uses a slightly different formula for assessing charges. Essentially, a merchant pays in some manner for each click that leads to their own web site. It is obvious to most users that the "sponsored links" at the top of the typical search screen are paid for, but the system of charges and sponsorship can be considerably more complex. The merchant has control over the key words that will affect the way the merchant's site turns up in an online search. The merchants generally bid on what they are willing to pay for a given click depending on how close the click (that is, the search result that yields the click) is to the top of the search result list. The more the merchant is willing to pay, the higher up the list the results will appear.

Click—through rate (CTR) is equal to the number of impressions (i.e., number of times an ad is viewed) required to generate a click on a lead. For example, if 100 impressions are needed (on average) to generate a click-through, then the click-through rate is 1%. The charges per click-through may also be related to click-through success (i.e., generation of a sale or of a qualified Lead). Click-through success is a term that describes the end results of clicking on a given lead. For example, a merchant may agree to pay a certain amount per successful click through up to a certain total number of clicks. A successful click through might be defined as one that yields a sale of a certain minimum magnitude or some other desired action such as filling out an application. If a click-through results in a sale or a lead, this is known as a "conversion." Many search systems allow advertisers to bid for certain words used to key the searches with more popular words costing more. At least one search system rewards creative customer advertisement by actually rewarding ads that have a successful click-through rate by charging them less per click. Suffice it to say, the variations are many; it can take a major effort simply to keep track of all the different policies. Plus very significant amounts of money are at stake. Online advertisers may pay hundreds of thousands of dollars a day to a single online search firm.

Because of the bidding and dynamic nature of the process it is no longer reasonable to design an advertising campaign, launch it and sit back to watch the results. With the various strategies of using and paying for online advertising and clicks an advertising campaign changes constantly and the overall strategy and activities are closer to those of active stock or commodity trading than to those of traditional advertising. The person responsible for online advertising must constantly monitor the success of various ads and the relationship between online ads, click-through conversions and overall expenditures for clicks. There are a myriad of strategies that can be used in online advertising, but key to all of them is the ability to constantly track results and rapidly modify aspects of the online efforts in response to results. The various online search and advertising vendors provide their clients with means to monitor their advertising and advertising costs and results (e.g., bids for clicks or key words). Considering that a given advertiser may employ the services of a dozen different online entities, this can be a daunting task.

The inventors of the present application have sought to simplify this task by providing a single tool or system for manipulating and viewing a plurality of advertising campaigns taking place on of a plurality of online search and similar services.

SUMMARY OF THE INVENTION

The system provides a simple, unified and secure way for a user to manage a number of separate online advertising accounts on online search engines. A simple and secure web page accessible through an ordinary web browser executing on a personal computer is used to both control the separate sites and to receive results from the sites. Essentially, a series of programs operating on one or more server computer are provided with a client's login information for each online search/advertising service that the user employs. Then the programs periodically logon to each of the various services, collect the current data available under the user's account and use the data to update a database that is subsequently displayed through a single unified secure web site. The user can then logon to this single custom web site and monitor the results from a plurality of different online accounts. In addition, the user can alter aspects of the various accounts (bid amount per click, etc.) through the site and these changes will be relayed to the individual accounts. Thus, the user is provided with simple "one stop shopping" for monitoring and controlling a complex online advertising operation. The user is always in control where ever the Internet is available either directly through a wire (or fiber optic) connection to a personal computer or through a wireless connection to a computer or through a cellular telephone that has Internet access. Information and alerts can also be sent automatically to one or more email addresses so that the user can maintain contact through a "push" email device such as a Blackberry.

Although access to the unified site through a web browser provides powerful and platform independent control of multiple online advertising accounts, a busy user may not have time to constantly refer to a web browser. For this reason the system also includes a "ticker" application that operates constantly on the user's personal computer. The ticker application constantly displays selected online data in a separate window that can quickly be brought to the front and checked as needed. It will be appreciated that "ticker" technology can also cause data to scroll across the menu bar, the desktop or other places on the computer screen. In addition the system can provide visual or audible alarms when the data from the online accounts indicate that certain preset threshold have been passed. When such an alarm state occurs, the ticker window automatically jumps into the foreground (possibly coincident with an alarm sound) so that the user will instantly pay attention. The system can be set by the user so that if the user does not respond to certain alarms within a predetermined time, the server applications will automatically send control messages to the online advertising accounts to avoid further problems. For example, a set alarm might occur when an advertising budget was being exceeded on one of the online accounts. If the user fails to respond, the system can automatically instruct the account that no further clicks will be purchased—thus forestalling additional budget excursions.

Because the servers constantly accumulate current data from a plurality of accounts, the system is in a unique position to provide the user with a variety of custom reports enabling the user to better control and exploit online advertising. The reports quickly show which online search services give the best results when identical ad campaigns are run on multiple services. When several different campaigns are run on a single service it is simple to see which campaign is the most effective. It is also possible to readily determine which ad strategy works best at which time of the day or on which time of the week, thereby enabling the savvy user to quickly tailor the most efficient and cost effective campaigns.

DESCRIPTION OF THE FIGURES

FIG. 1 shows a display page that allows a user to establish a security password and set up their various online advertising accounts with different vendors for access from the unified web site. Note that this screen shows the system operating by means of an ordinary web site.

FIG. 4 shows a detailed screen for manipulating specific aspects of an online advertising campaign on a particular online vendor by means of the unified website.

FIG. 5 shows the details of controlling the keywords in an online advertising campaign.

FIG. 6 shows a page whereby a user controls keyword bidding through the unified site.

FIG. 7 shows a page whereby a user can configure a custom report detailing a particular online advertising campaign.

FIG. 8 shows a page whereby a user can configure custom reports on an online advertising campaign and have those reports periodically sent by email.

FIG. 9 shows a screen that displays a chart of click conversions by day for a given advertising campaign thereby allowing the user to easily assess the impact of any changes to an advertisement.

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide an improved system for managing online advertising accounts.

The present invention greatly simplifies the management of online advertising by creating a single unified site for managing a plethora of separate online services. Essentially, a series of programs operating on a server computer are provided with a client's login information for each online search/advertising service that the client employs. Then the programs periodically logon to each of the various services, collect the current data available under the client's account, store the data in a database and use the data to update a single unified secure site. The client can then logon to this single custom site and monitor the results from a plurality of different online services in one convenient location. In addition, the client can alter aspects of the various services (bid amount per click, keywords, etc.) on the site by providing changes in the form of control parameters and these changes will be relayed by the server programs to the individual services. Thus, the client is provided with simple "one stop shopping" for monitoring and controlling a complex online advertising operation. This aspect of the invention solves many of the difficulties faced by the online advertiser.

The unified secure site is conveniently accessed and controlled by a user through the Internet. The server side applications are controlled by a number of scripts that interact with the user through web pages displayed on a web browser. This avoids the requirement for custom client software and makes cross platform use of the invention relatively simple. FIG. 1 shows a typical screen that allows a new user to create a new account along with a password. In this process the user puts in the account identification and password information for each of the online advertising accounts the user owns. This information is stored in the database and used by the system to retrieve data from each account concerning the searches, clicks and ultimately conversions going on in each separate advertising campaign. The information is also used to send control parameters to each account.

Figures 2, 3:
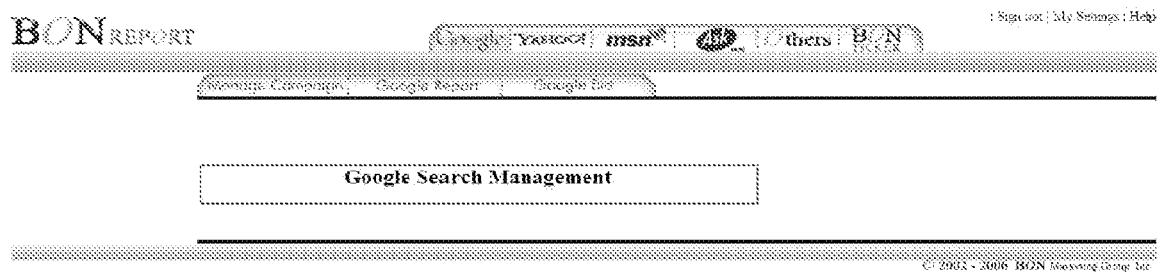
FIG. 2 shows a display that demonstrates that after an account is established and a user logs in, each different online vendor (Google, Yahoo, MSN, etc.) is available by simply clicking on the appropriate tab.
FIG. 3 shows a screen for manipulating each online vendor account to establish or modify (or end) a particular online advertising campaign.

Once the account is set up and the online advertising account information has been input, the user is able to sign in to the unified web page (using a typical password log in procedure). The user then view a "tabbed" screen view as seen in FIG. 2. Note that in this tabbed metaphor each of the separate online accounts is present as a tab at the top of the screen. When the user selects one of the tabs, a new series of tabs specific to the chosen account appears. The new tabs allow the user to control the parameters of the chosen online account. It will be apparent to one of ordinary skill in the art that any number of equivalent graphical user interfaces (GUIs) can be used to achieve the same end. Rather than tabs icons, radio buttons, hypertext links, check boxes or individual windows could be presented allowing the user to make the selections. The databases contain the information and display it in a uniform graphical presentation that allows the user to readily make the necessary choices.

The choices available to the user are those reasonably necessary to view and manipulate the chosen account. In this example the user is able to manage a specific online account, produce a report detailing the results obtained from the given online account and control the parameters (the bid) of the account. Because the system is acting as a unified gateway to a plurality of online accounts, these precise choices may vary from account to account because the features of the accounts themselves vary. Nevertheless, by filtering the separate accounts through the unified system a much more consistent user interface is provided making it much simpler for a busy user to manage and monitor a number of accounts without having to read directions or manuals for each account.

Figure 4:
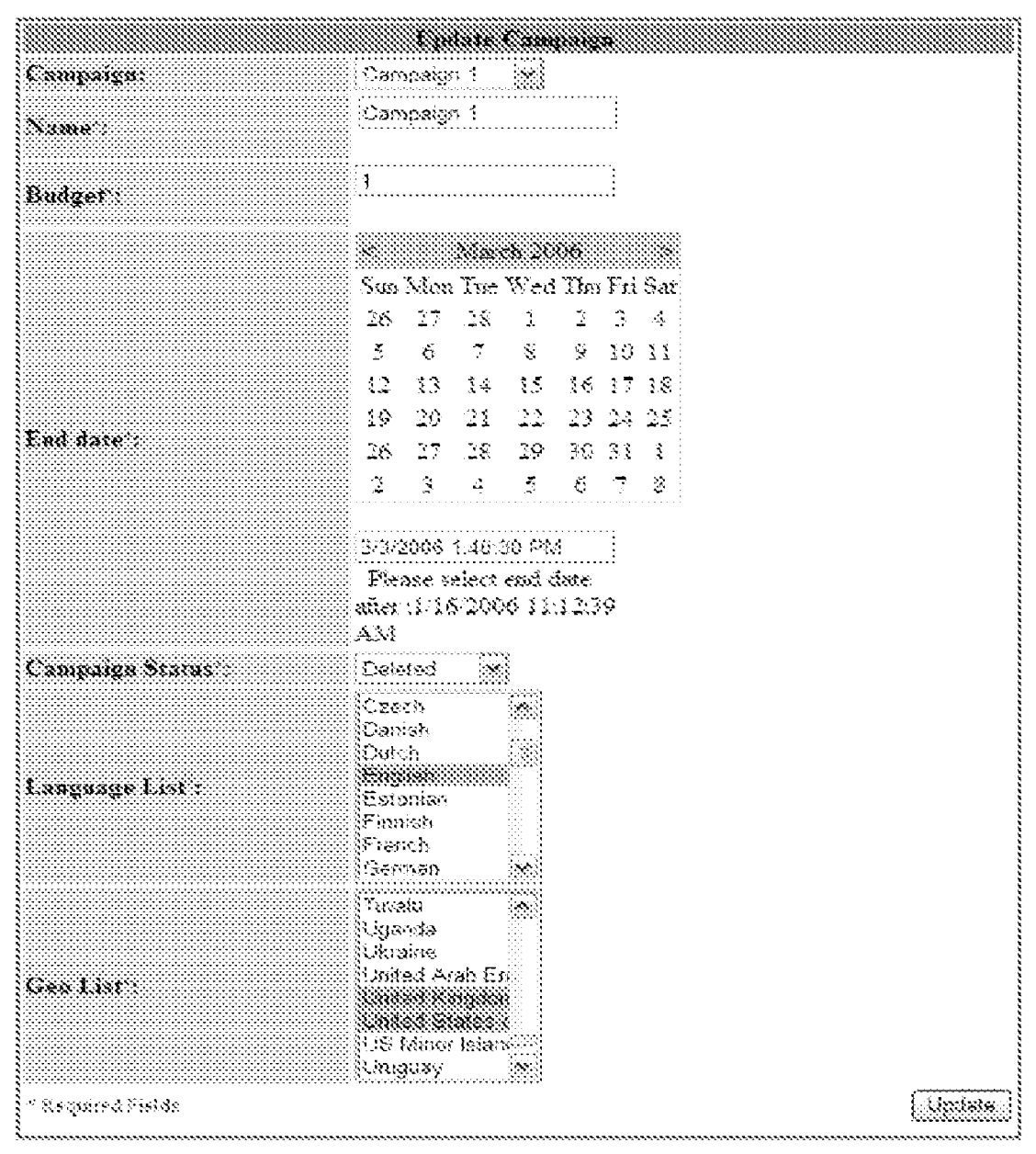
Figures 5, 7:
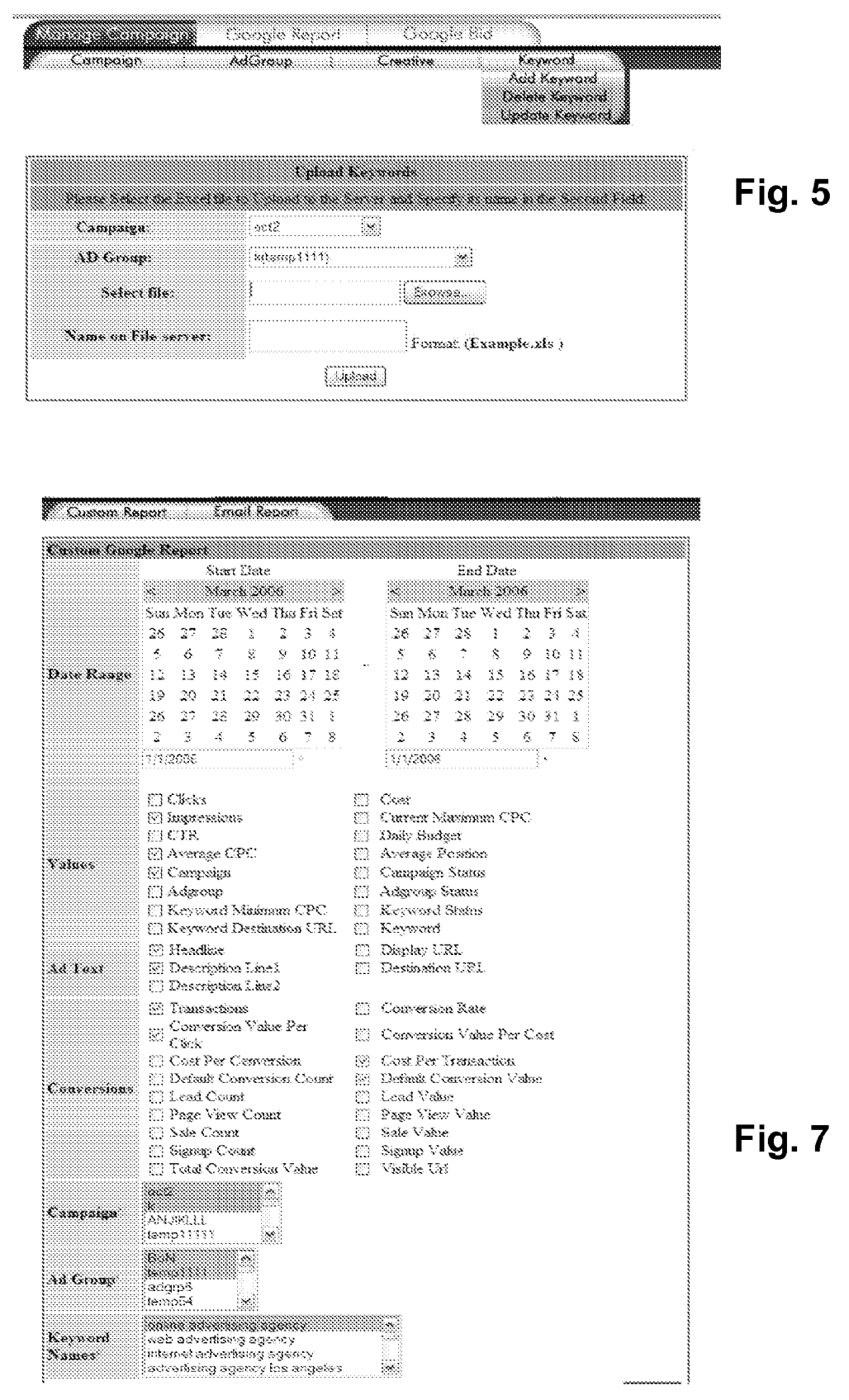
Figures 6, 9:
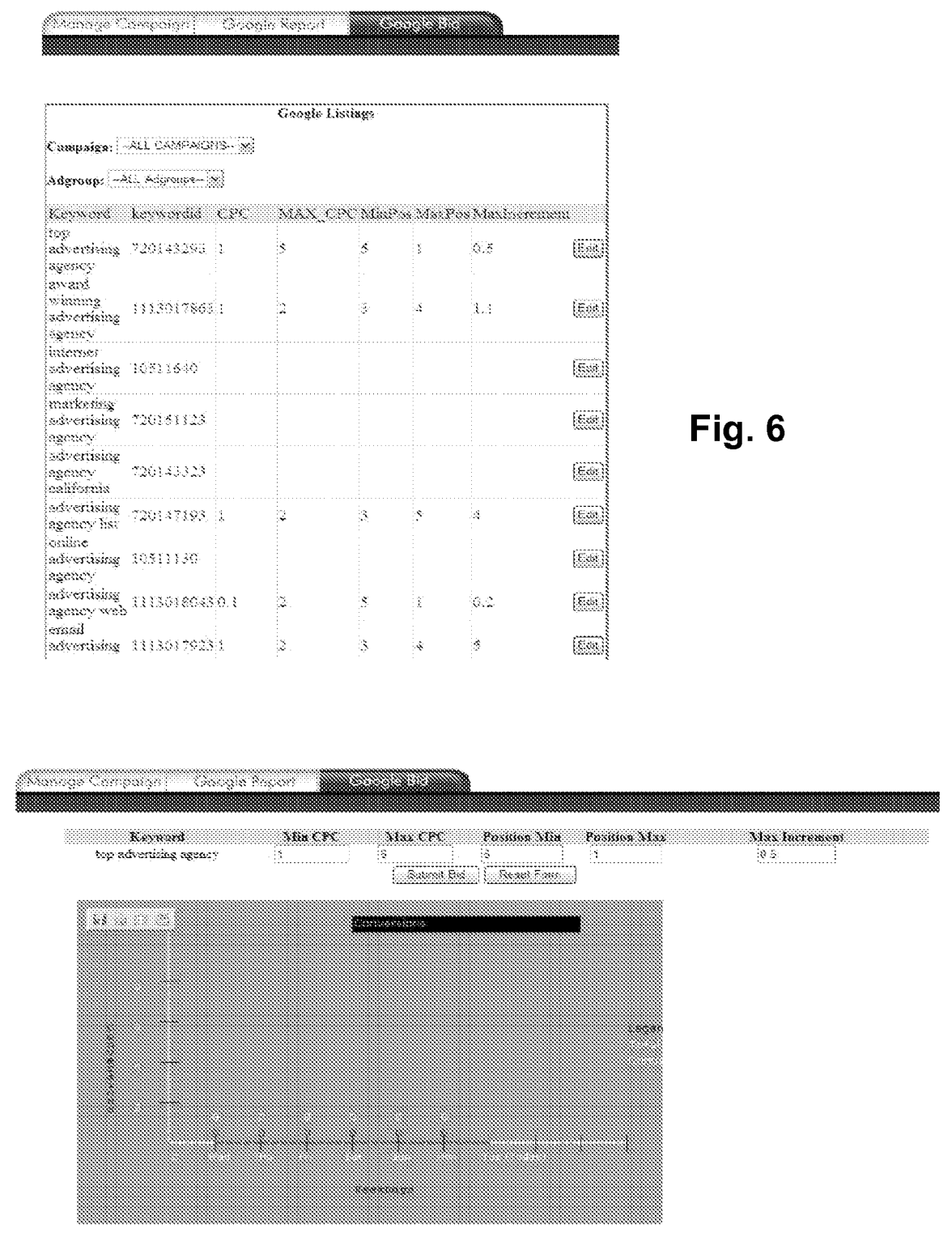

FIG. 3 shows a screen that allows the user to add, delete or modify (update) an ad campaign on a chosen online account. A simple calendar interface allows the user to set beginning and ending dates for the given campaign. Daily budgets are readily set and the system can prevent the campaign from exceeding that budget. Additional aspects of the campaign, such as language, are controlled by means of a screen such as the one shown in FIG. 4. The actual keywords used in an ad campaign are most conveniently controlled by a spreadsheet file (this ensures that corresponding campaigns on different online services use the same words), and a screen such as the one shown in FIG. 5 can be used to upload such a file to the online service. FIG. 6 shows a screen which allows the user to change the parameters for each keyword for the keyword bidding process after the keywords have been input. This allows the user to readily stay within budget by controlling the cost per click (CPC) for each keyword. The user also can control the position the ad is to appear, etc.

Of course, the entire point of an online campaign is to produce actual economic results. The inventive system retrieves those results from the various online services and processes them in a uniform manner to yield consistent reports so that the results of one online campaign can be compared to the results of another. FIG. 7 shows a screen used by a user to input the various report parameters that are desired in a given report. As is the case for an overall campaign the user can specify the date range. Within the specified range the number of clicks, impressions, cost per click, conversions per click and cost for conversion are selectable as well as a of other ad related items (such as total cost, lead count, overall cost, daily budget, cost per transaction, etc.) well know to one of skill in the art. It will be apparent that these report parameters as well as the underlying control parameters are flexible and will change according to changes in the online advertising search engines themselves. The present invention is flexible and readily adapts to any such changes.

Figure 8:
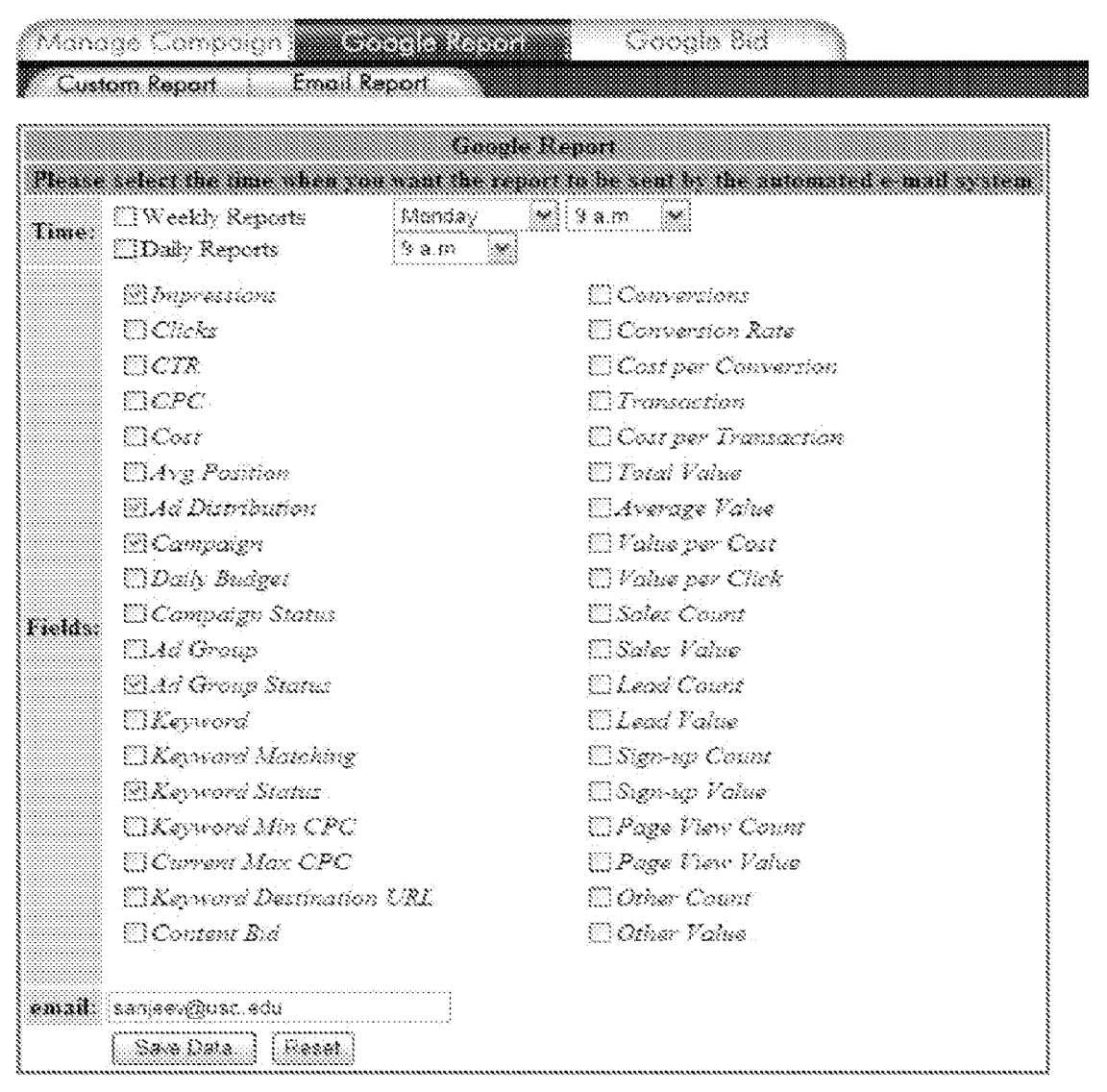

Not only can custom reports be readily produced they can also be automatically emailed to key personnel. FIG. 8 shows a screen that allows the user to customize a "mini" or "snapshot" report to a given email address. Of course, it is also possible to email the more complete report generated according through the screen of FIG. 7. FIG. 9 shows a graphical report showing the rate of conversions by day of the week for a particular campaign. This allows the user to determine if certain ad campaigns are more effective on certain days of the week or even times of the year, thereby allowing the system to be programmed to take advantage of any such changes.

In spite of all the report features just explained, the problem that plagues the busy executive who has responsibility for a set of online advertising campaigns is that the executive is usually too busy to spend time logged in to the unified site or to any other similar "one stop shop" reporting services. With large amounts of money constantly at stake an extension of the unified site is needed so as to implement some type of "alarm" system so that the executive can be made quickly aware of the present state of the online campaign and can be quickly warned when any of the parameters of the campaign go outside of preset limits. The present invention provides means for rapidly assessing the status of an online campaign and means for warning a user when preselected limits are exceeded. This aspect of the invention works in consort with the unified secure web site described above. That site already contains a constantly updated picture of a client's online campaigns as well as unified controls that allow changes to be made in that campaign. The present invention operates by comparing a user generated list to the unified web site and acting in response to that comparison. The actions consist of instantly transferring specified data to the user whenever those data are updated, of warning the user when the updated data fall outside of preset boundaries and in taking preset corrective actions subject to certain actions on the part of the user. User interaction generally takes place by means of a special program constantly running on the user's personal computer although remote email interactions can also be selected. It will be appreciated that the term "personal computer" includes any and all of a variety of digital devices capable of executing software including desktop and laptop computers, personal digital devices, tablet and pocket personal computers and advanced cellular telephones (and combinations thereof).

The first step in using the invention is for a client of the unified secure site to establish their preferences for operation of the inventive warning and display system. This is preferably achieved by entering those preferences into a secure web page that is part of the client's secure unified site. That preference page gives the client access to a large number of parameters related to the client's online advertising operations. Table 1 shows a partial presentation of those parameters.

TABLE 1

| Parameter | Publish (T or E) | Alarm (A, V or E) | Response (Y or N) |
|---|---|---|---|
| Number of clicks | | | |
| Number of clicks by keyword or listing | | | |
| Number of sales | | | |
| Number of sales by keyword or listing | | | |
| Number of sales by creative unit (by campaign—banners, pops, email, etc) | | | |
| Cost per sale | | | |
| Cost per sale by keyword or listing | | | |
| Total cost of sales | | | |
| Total cost of sales by campaign | | | |

The user can control the invention by filling out these preferences. The second column indicates whether the system should publish the given parameter. Publication consists of automatically outputting the published parameter each time it is updated. In this example the user is given the choice of two means of publishing, The "T" setting outputs the parameter for instant display by way of a "ticker" on the user's computer as will be described below. The "E" setting causes the parameter to be emailed, for example to the user's Blackberry. If the "E" setting is chosen, the user is also given a chance to "filter" the email publication according to frequency or magnitude of change to avoid a flurry of emails reporting insignificant changes. The third column is the Alarm column. The user inserts an alarm range, and if the parameter goes outside of the range, an alarm is generated. By default the alarm is sent to the user's computer where it makes a visual ("V") or audible ("A") alarm to bring the matter to the user's attention. Normally, only fairly critical parameters such as cost goals will be alarmed to avoid a cacophony of mostly meaningless alarms. The user can also have the alarm emailed ("E") so the executive can be alerted by Blackberry. A number of optional alarm features may also be available so that a user will hear a certain key sound (or see a visual) for each sale or for each sale from a certain campaign, etc. Also, the system can be set to indicate which campaign or which online search service was responsible for a given sale or other factor. It will be appreciated that the user can use a Blackberry or similar mobile device to access the unified secure web page and change the setting on the online campaign to solve the alarm situation.

The final Response column would normally be turned on ("Y") only for the most critical alarmed parameters. If the user turns on Response, another page will appear allowing the user to define the response. A good example of using the Response would be a situation where the user has a fairly critical total cost of sales target. For example, a given campaign may be tightly budgeted at a certain maximum cost. If a sudden surge in sales causes the costs to approach that maximum cost, the user may wish to respond automatically in some way. If Response is turned on ("Y"), the user is taken to a response page to set up the future response. In the case of a maximum cost being exceeded, a possible response would be to dramatically lower critical bids for clicks to slow the expenditure. The default Response causes the proposed response to appear on the user's computer in a special message dialog that gives the user the opportunity to accept of reject the proposed response. This makes things exceedingly easy for the user who no longer has to log on to the secure unified site (or the individual site of the online search company) to affect the change. The user can also set the Response system to make the change automatically (sort of a "dead man's switch") if the user does not respond within a given amount of time. This option must be used with caution but if properly configured, it may save the day when an executive is temporarily unable to respond in a timely manner.

The "Ticker"

The preferred means of display on the user's computer is an independent client program that constantly runs on the user's system. In a preferred embodiment the client is built using the Microsoft .NET framework. The program is coded using ASP .NET and MS SQL Server. The application executes through the .Net Runtime and interacts with one or more servers and with the databases, html pages and ASP (action server pages) pages to provide the desired functionality. Alternate platforms that can provide similar results include the Weblogix platform combined with Java, JRun, Vitria and WebSphere. Additional platforms are known to those of skill in the art and more will evolve in time. The client-server interaction of the client program is according to the HTTP standard for web communication. The current client is written in C# and is executed on the user's local system. It will be apparent to one of skill in the art than any number of other software systems and protocols such as the Macromedia Flash components, Java applets or RSS (Really Simple Syndication) feeds could be used to achieve similar results. In addition certain modern operating systems contain built in facilities for small applets to readily interact with web sites and provide similar functionality ("Widgets" in MacOS Tiger and "Gadgets" in Microsoft Windows Vista).

The client software can display the required information on the client computer in a variety of manners. Because the software is intended to operate in the background, its normal displays should not be obtrusive. That is why the software is referred to as a "Ticker" because most of the displayed information appears like a stock ticker running across the top or bottom of the screen or in a special unobtrusive window. Critical alarms can appear in special window on top of the normal windows on the computer screen. Such special displays can also flash, change colors or call attention to themselves in some other way. In addition, various audio alerts and effects can occur.

Figure 10:
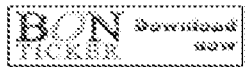
FIG. 10 shows one of the web pages by which a user is able to control which data are automatically fed to the ticker software application.

The entire system of the unified web site and the ticker are readily controlled through web pages so that the system as a whole can be accessed and controlled from any computer that can support a web browser. The overall alarm/notification function is discussed above. FIG. 10 shows a web page configured for a user to control precisely which data are displayed by the Ticker for each online advertising account. As will be apparent to one of skill in the art the list of data viewable on the ticker overlaps the list of data (report parameters) contained in reports which is quite extensive so as to give the user many different ways to view the results and includes at least the following: date range, impressions, clicks, click through rate (CTR), cost per click (CPC), cost, average ad position, ad distribution, campaign name, daily budget (for campaign), ad group, ad group status, keywords, keyword matching, key word status, minimum and maximum CPC per keyword, URL destination for keyword, content bid, conversions, conversion rate, cost per conversion, transactions, cost per transaction, total value, average value, value per cost, value per click, sales count, sales value, lead count, lead value, sign-up count, sign-up value, page view count, and page view value.

Figure 11:
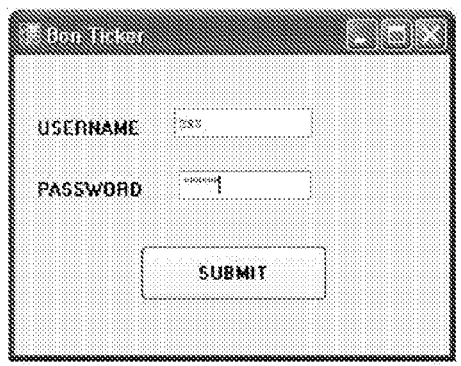
FIG. 11 shows a login window that appears each time the ticker application is started.

For security purposes the client software prompts the user for login information (username, password). FIG. 11 shows a login window that appears when the Ticker is first invoked. Normally ticker applications run automatically and continuously on a computer, but because the financial information displayed can be sensitive, the login window ensures that unauthorized individuals cannot view the information or alter the online campaign The login information is encoded in an http request which is sent to the unified secure site server. The server authenticates the user and the appropriate http responses are sent back. The http response will be rendered by the client program running on the user's computer.

Sample Request:
<HTTPRequest>
<Username>foo</Username>
<Password>abcd</Password>
</HTTPRequest>
Sample Success Response:
<HTTPResponse>
<CLICKS>15 rows affected.</CLICKS>
<SALES>5 rows affected.</SALES>
<COST>3 rows affected.</COST>
</HTTPResponse>
Sample Error Response:
<HTTPResponse>
<ERROR>Error Message-User cannot be authorized</ERROR>
</HTTPResponse>

Figure 12:
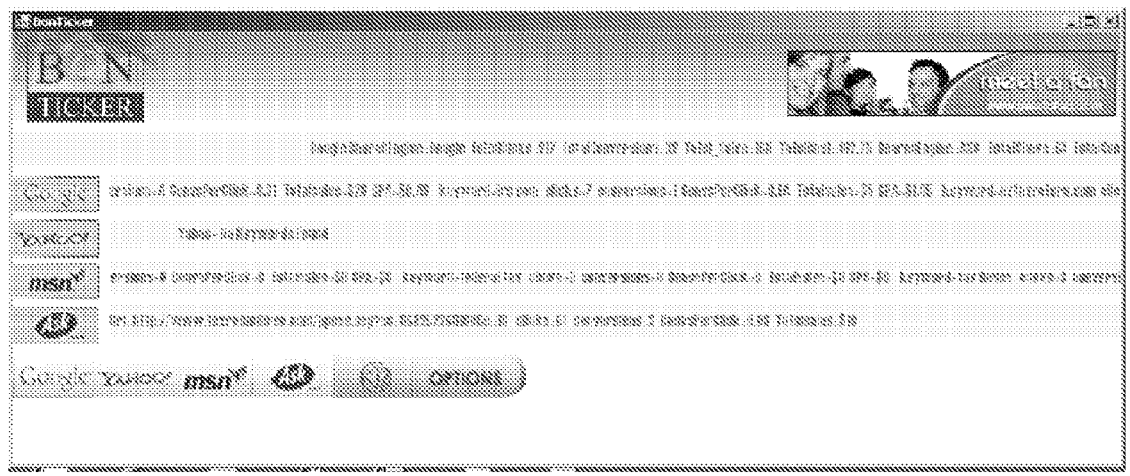
FIG. 12 shows a typical ticker with data where keyword data for one of the online accounts has not yet been configured
Figure 13:
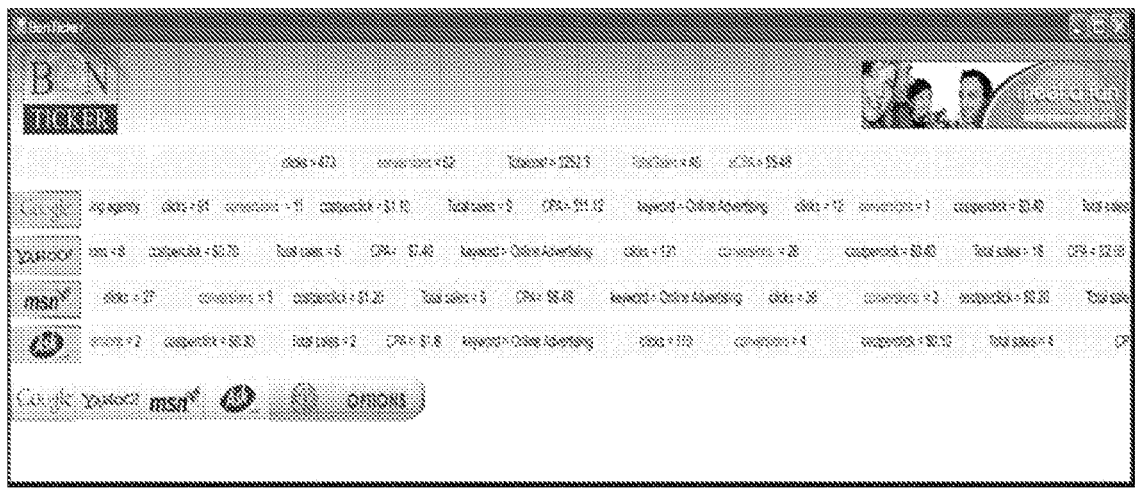
FIG. 13 shows the ticker displaying data feeds from all four of the online vendors used by this particular user and showing an overall summary.
Figure 14:
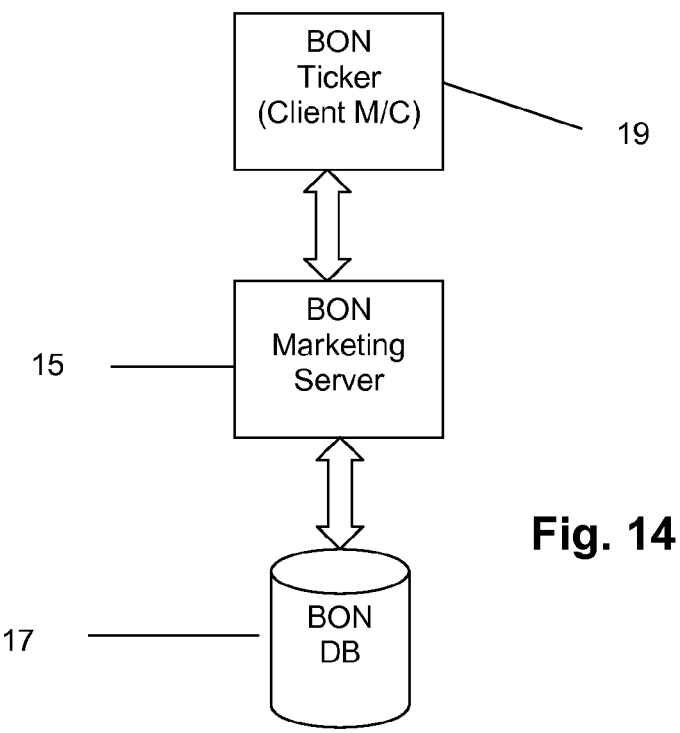
FIG. 14 diagrammatically indicates the relationship between the databases, the secure web site and the ticker.

After the system is configured and login has been accomplished a Ticker window (shown in FIG. 12) appears in a portion of the computer screen. This is a typical window and can be moved, cancelled or minimized. A number of buttons or tabs appear along the lower portion of the window to control the display. This allows the user to select on the fly which of the configured accounts will appear in the window. The "speaker" button allows the audio alerts to be muted while the "options" buttons allows control of other aspects of the Ticker. Note that in this image ticker data are scrolling across the window but one of the accounts shows no data because that account is either not operating or is not configured properly on the unified web page. FIG. 13 shows a Ticker where all of the accounts are configured and displaying data. The Ticker application receives the configured data from the unified web page which intern controls and receives data from the individual online advertising accounts. Applications operating on the server 15 send messages to the individual online accounts and receive data therefrom which data are stored in the server database 17. Then server applications stream the proper data from the database 17 to the Ticker application 19 over the Internet.

The following claims are thus to be understood to include what is specifically illustrated and described above, what is conceptually equivalent, what can be obviously substituted and also what essentially incorporates the essential idea of the invention. Those skilled in the art will appreciate that various adaptations and modifications of the just-described preferred embodiment can be configured without departing from the scope of the invention. The illustrated embodiment has been set forth only for the purposes of example and that should not be taken as limiting the invention. Therefore, it is to be understood that, within the scope of the appended claims, the invention may be practiced other than as specifically described herein.

What is claimed is:

1. A system for simultaneously managing a plurality of online advertising search engine accounts to control online advertising campaigns in a unified manner comprising:
   one or more Internet connected servers which serve a web site comprising:
      a search engine account web page allowing a user to input and display of account identification and account password information for at least two online advertising search engine accounts;
      an account database which stores the account identification and account password information input into the at least two search engine account web pages;
      a control parameter web page allowing a user to input and display control parameters for online advertising campaigns on the at least two online advertising search engine accounts;
      a control database which stores the control parameters input into the control parameter web pages;
      a software program which uses the account identification and account password information from the account database to log onto the online advertising search engine account web pages for transmitting the control parameters from the control database to the corresponding online advertising search engine account so that each online advertising search engine account implements the control parameters and for obtaining from each of the online advertising search engine accounts data reflective of activities of the online advertising campaigns on each of the online advertising search engine accounts wherein the software program monitors each of the online advertising campaigns to obtain new data whenever the data changes;
      an activities database which stores the data obtained by the software program from the online advertizing advertising campaigns from each of the online advertising search engine accounts; and
      an application to stream the data from the activities database over the Internet;
   a user personal computer device connectable to the Internet comprising:
      a ticker program operating on the user computer device for instantly displaying data streamed from the activities database.

2. The system according to claim 1, wherein the search engine account web page and control parameter web pages page are part of a secure web site.

3. The system according to claim 1, wherein the control parameters are selected from the group consisting of keywords, costs per click and ad position.

4. The system according to claim 1, wherein one or more alarms based on data from the activities database are presented to the user.

5. The system according to claim 4, wherein the user sets parameters that control the one or more alarms.

6. The system according to claim 4, wherein the one or more alarms can be audible, visual or both audible and visual.

7. The system according to claim 4, wherein the one or more alarms are displayed by the ticker program.

8. The system according to claim 1 further comprising a web browser program operating on the user computing device for accessing the one or more search engine account web pages and/or the one or more control parameter web pages and the activities database to display the data therein and to display reports and alarms.

9. The system according to claim 8, wherein a custom report is displayed based on report parameters input by the user and data in the activities database.

10. The system according to claim 9, wherein the report parameters are selected from the group consisting of date range, impressions, clicks, click through rate (CTR), cost per click (CPC), cost, average ad position, ad distribution, campaign name, daily budget, ad group, ad group status, keywords, keyword matching, key word status, minimum and maximum CPC per keyword, URL destination for keyword, content bid, conversions, conversion rate, cost per conversion, transactions, cost per transaction, total value, average value, value per cost, value per click, sales count, sales value, lead count, lead value, sign-up count, sign-up value, page view count, and page view value.

11. The system according to claim 1, wherein the data displayed by the ticker program are selected from the group consisting of date range, impressions, clicks, click through rate (CTR), cost per click (CPC), cost, average ad position, ad distribution, campaign name, daily budget, ad group, ad group status, keywords, keyword matching, key word status, minimum and maximum CPC per keyword, URL destination for keyword, content bid, conversions, conversion rate, cost per conversion, transactions, cost per transaction, total value, average value, value per cost, value per click, sales count, sales value, lead count, lead value, sign-up count, sign-up value, page view count, and page view value.

* * * * *